(12) United States Patent
Trui et al.

(10) Patent No.: US 12,172,302 B2
(45) Date of Patent: Dec. 24, 2024

(54) SPHERICAL COORDINATE MECHANISM

(71) Applicant: Wen-Der Trui, Taichung (TW)

(72) Inventors: Wen-Der Trui, Taichung (TW); Shu-Ching Lin, Taichung (TW)

(73) Assignee: Wen-Der TRUI, Taichung (TW)

( * ) Notice: Subject to any disclaimer, the term of this patent is extended or adjusted under 35 U.S.C. 154(b) by 0 days.

(21) Appl. No.: 18/176,674

(22) Filed: Mar. 1, 2023

(65) Prior Publication Data

US 2023/0278193 A1  Sep. 7, 2023

(30) Foreign Application Priority Data

Mar. 1, 2022 (TW) .................................. 111107154

(51) Int. Cl.
| | | |
|---|---|---|
| *B25J 9/04* | (2006.01) | |
| *B25J 9/00* | (2006.01) | |
| *B25J 9/10* | (2006.01) | |
| *F16M 11/12* | (2006.01) | |

(52) U.S. Cl.
CPC ............. *B25J 9/0048* (2013.01); *B25J 9/045* (2013.01); *B25J 9/104* (2013.01); *F16M 11/123* (2013.01)

(58) Field of Classification Search
CPC ........ B25J 9/0045; B25J 9/0048; B25J 9/045; B25J 9/104
See application file for complete search history.

(56) References Cited

U.S. PATENT DOCUMENTS

| | | | | |
|---|---|---|---|---|
| 6,026,703 A | * | 2/2000 | Stanisic | ................ B25J 18/007 |
| | | | | 464/106 |
| 8,579,714 B2 | | 11/2013 | Trui et al. | |
| 9,579,786 B2 | | 2/2017 | Trui et al. | |
| 9,851,045 B2 | * | 12/2017 | Trui | ...................... G01B 5/004 |
| 11,000,946 B2 | * | 5/2021 | Nose | ...................... B25J 9/0021 |
| 11,904,465 B2 | * | 2/2024 | Trui | ...................... B25J 9/0048 |

FOREIGN PATENT DOCUMENTS

| | | |
|---|---|---|
| CN | 104511904 A | 4/2015 |
| CN | 107030682 A | 8/2017 |
| EP | 2863102 A1 | 4/2015 |
| EP | 3196532 A1 | 7/2017 |
| JP | 2015-068502 A | 4/2015 |
| JP | 2017-125612 A | 7/2017 |

* cited by examiner

*Primary Examiner* — William C Joyce
(74) *Attorney, Agent, or Firm* — Maier & Maier, PLLC

(57) ABSTRACT

A mechanism is constructed by spherical concentric geometry and controlled by spherical coordinate kinematics. Transmission belts, pulleys, shafts, and spur gears are added onto three arc-link sets. Via these transmission components, base arc-links can be indirectly or directly but synchronously rotated by base driving modules and terminal arc-links can be indirectly or directly but synchronously rotated by terminal driving modules.

6 Claims, 16 Drawing Sheets

SPHERICAL COORDINATE MECHANISM

FIELD

The mechanism is constructed by spherical concentric geometry for spherical coordinate kinematics.

BACKGROUND

The mechanism is inherited the similar concentric geometry from our three certified patents. The first certified patent (U.S. Pat. No. 8,579,714B2), the second certified patents (U.S. Pat. No. 9,579,786B2, EP2863102, CN104511904A, JP2014-196071) and the third certified patents (U.S. Pat. No. 9,851,045B2, EP3196532, CN107030682A, JP2017-005465).

To compare significantly difference with the third certified patents, new features in this invention are emphasized: adding transmission belts, pulleys, bored shafts, and spur gears onto three arc-link sets. Via these transmission components, base arc-links can be indirectly or directly but synchronously rotated by base driving modules and terminal arc-links can be indirectly or directly but synchronously rotated by terminal driving modules.

The above and other objects, features and advantages of the mechanism will become apparent from the following detailed description taken with the accompanying drawings.

SUMMARY

It is one objective of the present disclosure to provide a mechanism with spherical concentric geometry to be manipulated for spherical coordinate kinematics. A spherical coordinate mechanism includes a base frame set, a terminal frame set, three arc-link sets, three base driver sets, three terminal driver sets. There are two embodiments for sufficiently introducing the spherical coordinate mechanism.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1A:
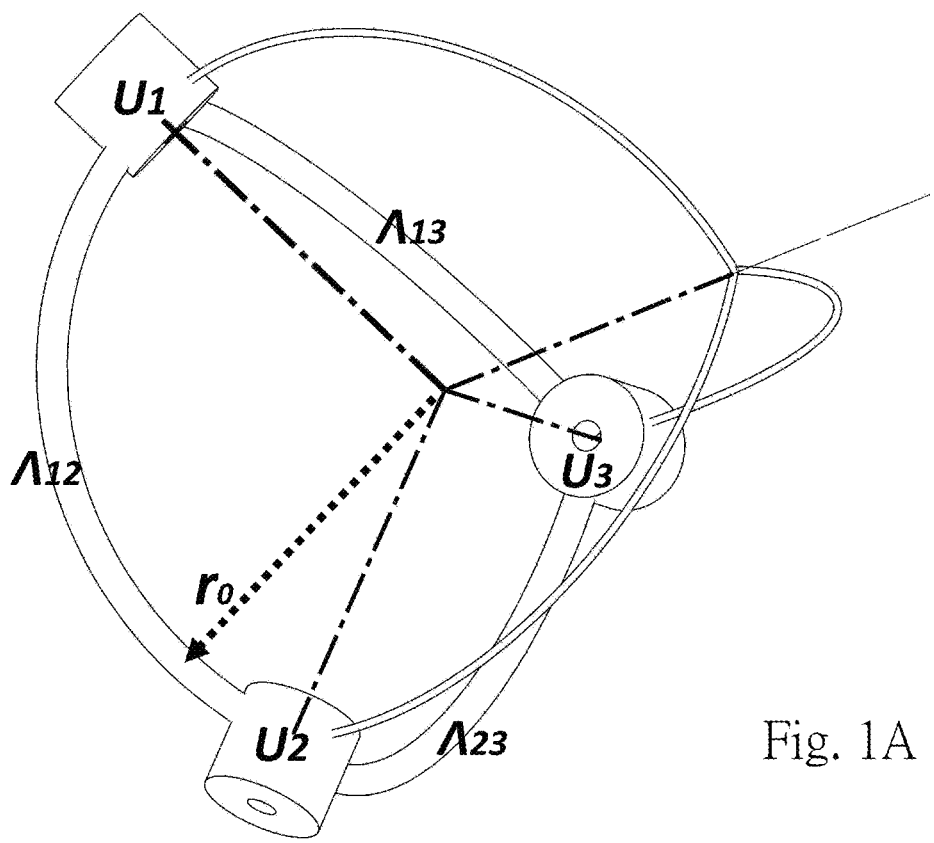
FIG. 1A shows a geometry and 3-view drawing of base frame for orbit sequence I.
Figure 2A:
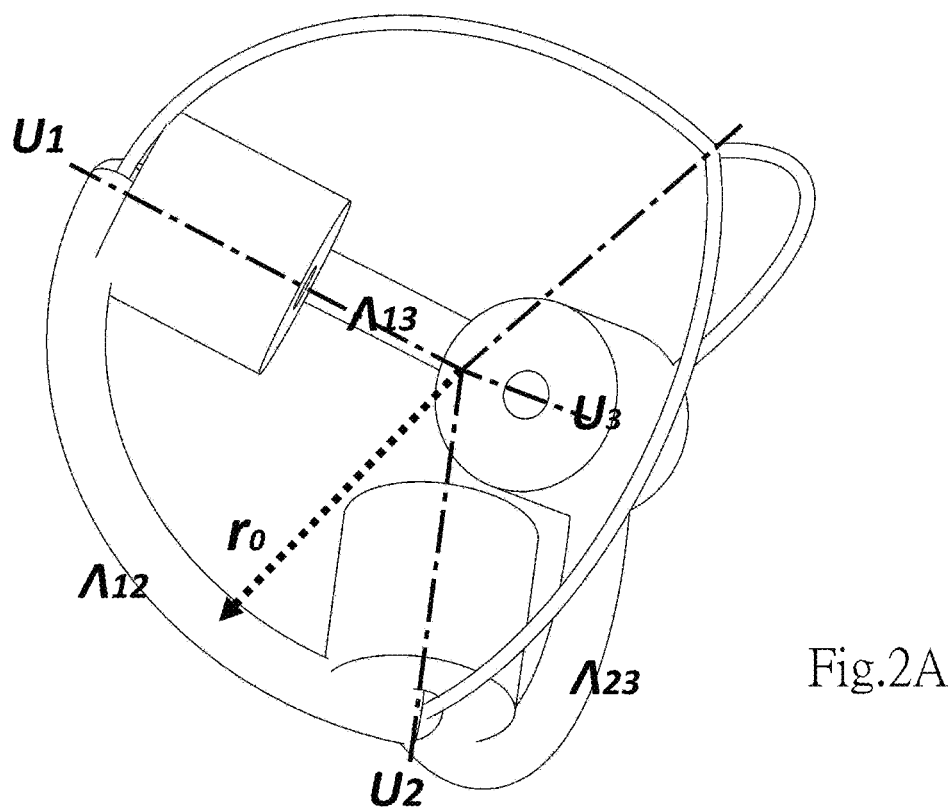
FIG. 2A shows a geometry and 3-view drawing of base frame for orbit sequence II.
Figure 3A:
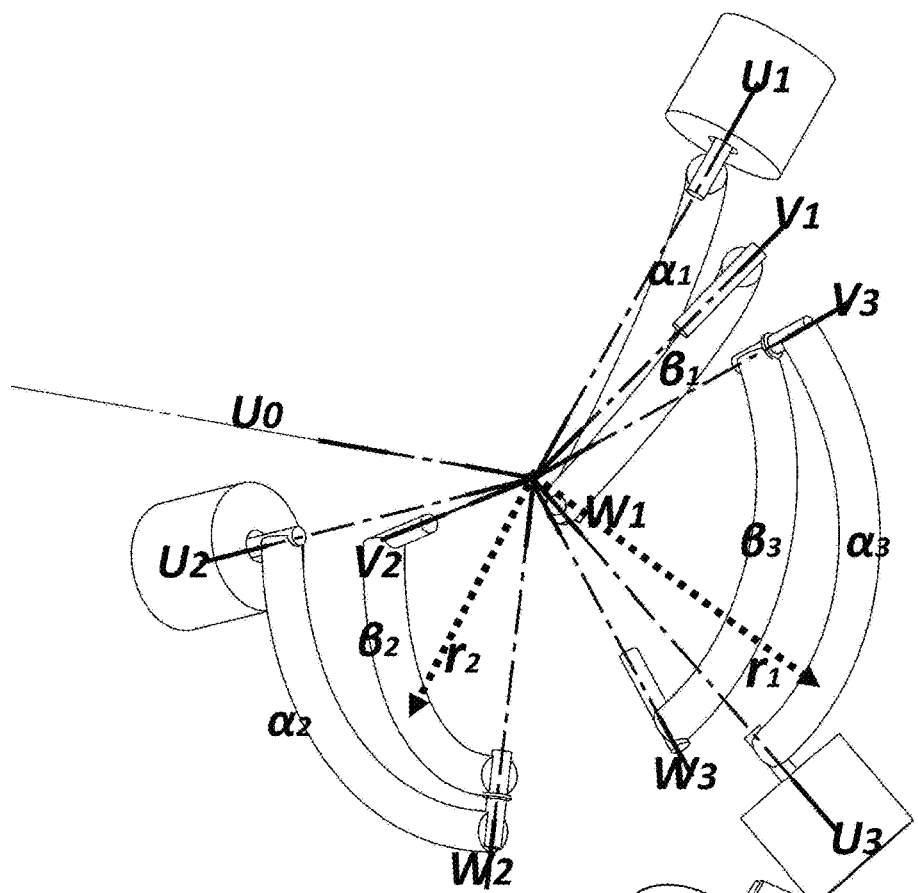
FIG. 3A shows a geometry and 3-view drawing of three arc-link sets for orbit sequence I.
Figure 4A:
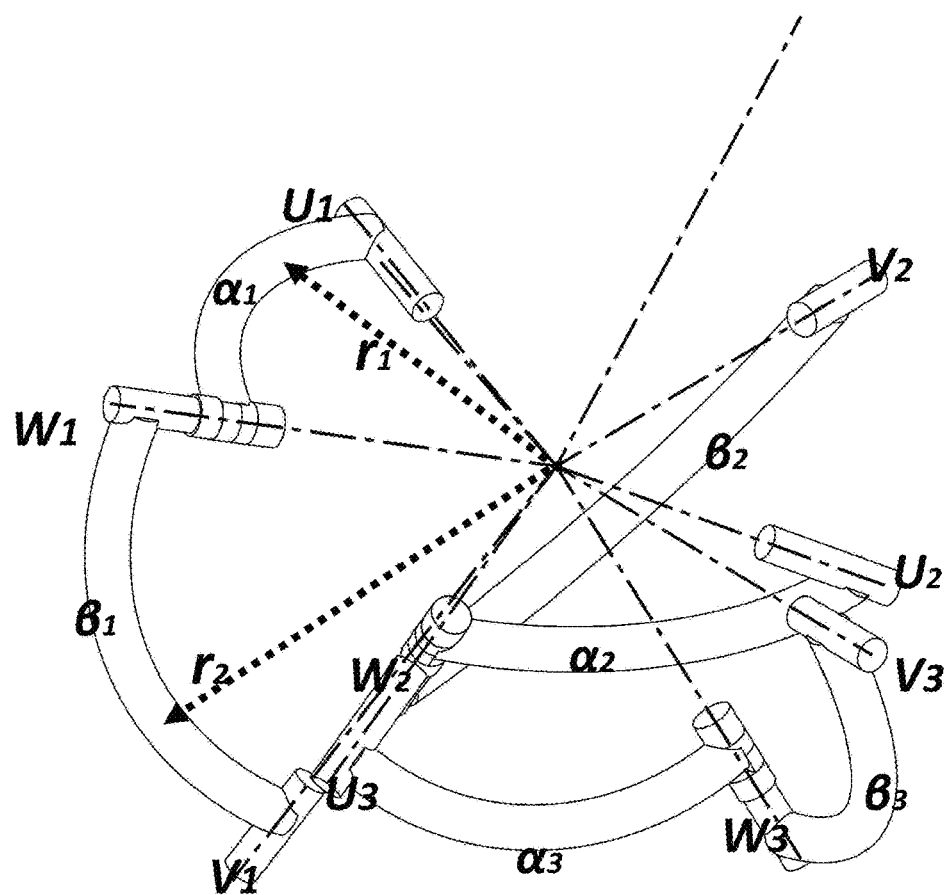
FIG. 4A shows a geometry and 3-view drawing of three arc-link sets for orbit sequence II.
Figure 5A:
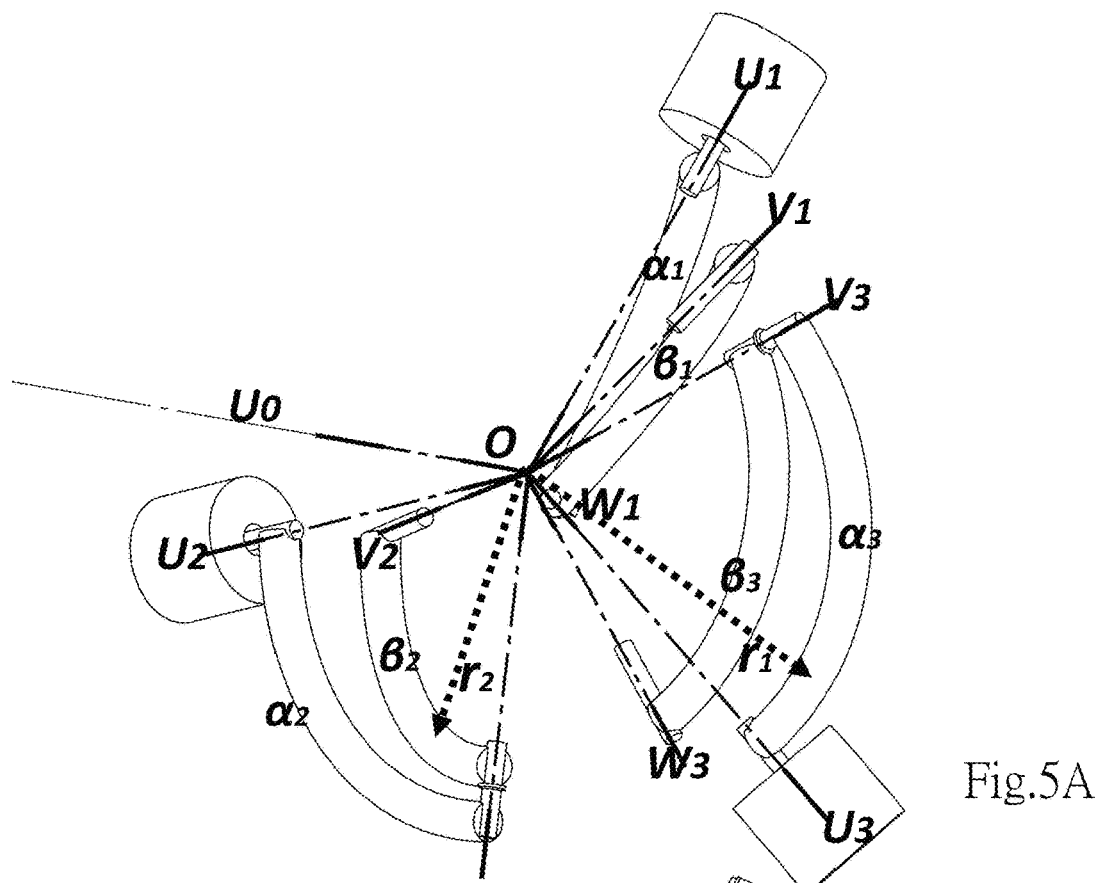
FIG. 5A shows a geometry and 3-view drawing of three arc-link sets for orbit sequence I.
Figure 6A:
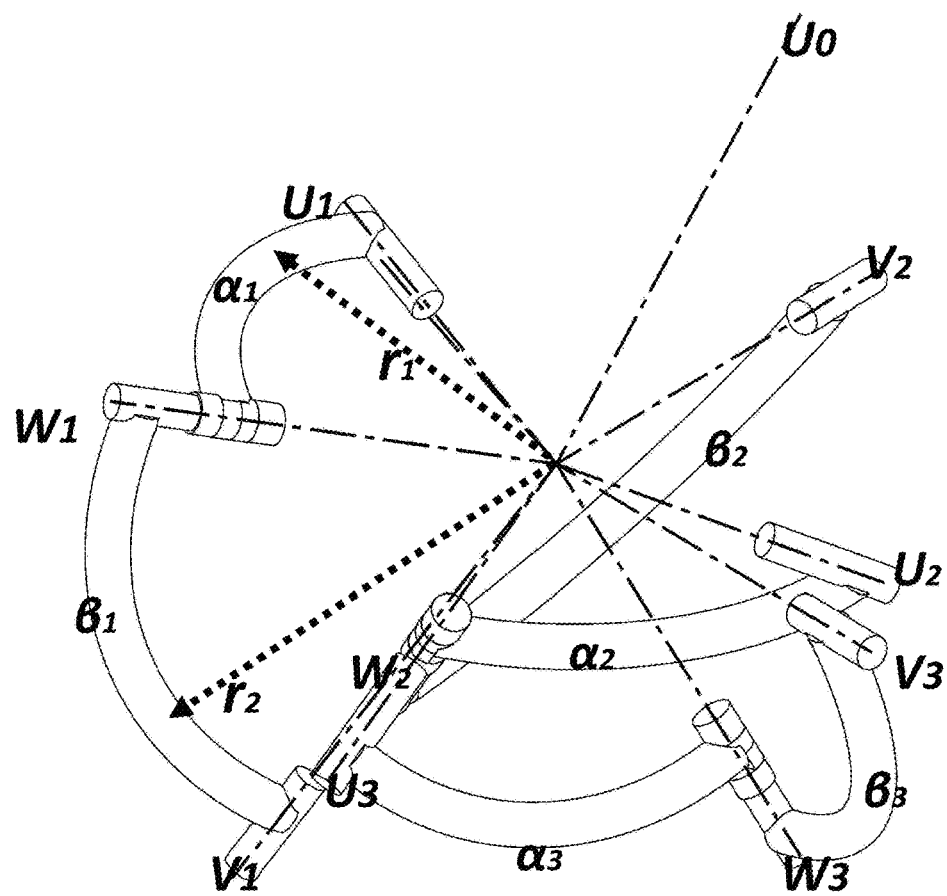
FIG. 6A shows a geometry and 3-view drawing of three arc-link sets for orbit sequence II.
Figure 7A:
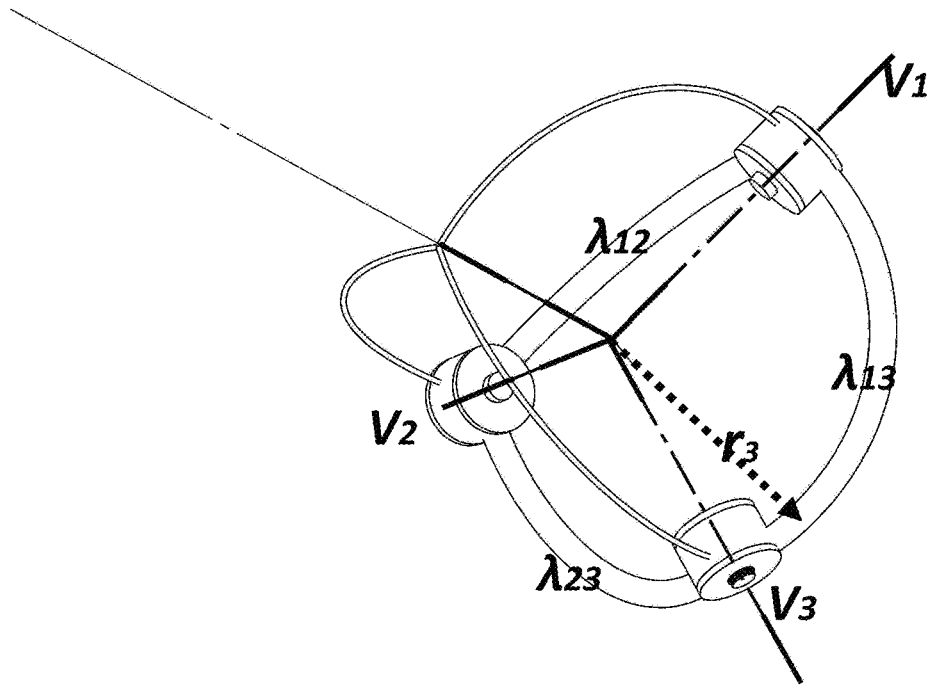
FIG. 7A shows a geometry and 3-view drawing of terminal frame for orbit sequence I.
Figure 8A:
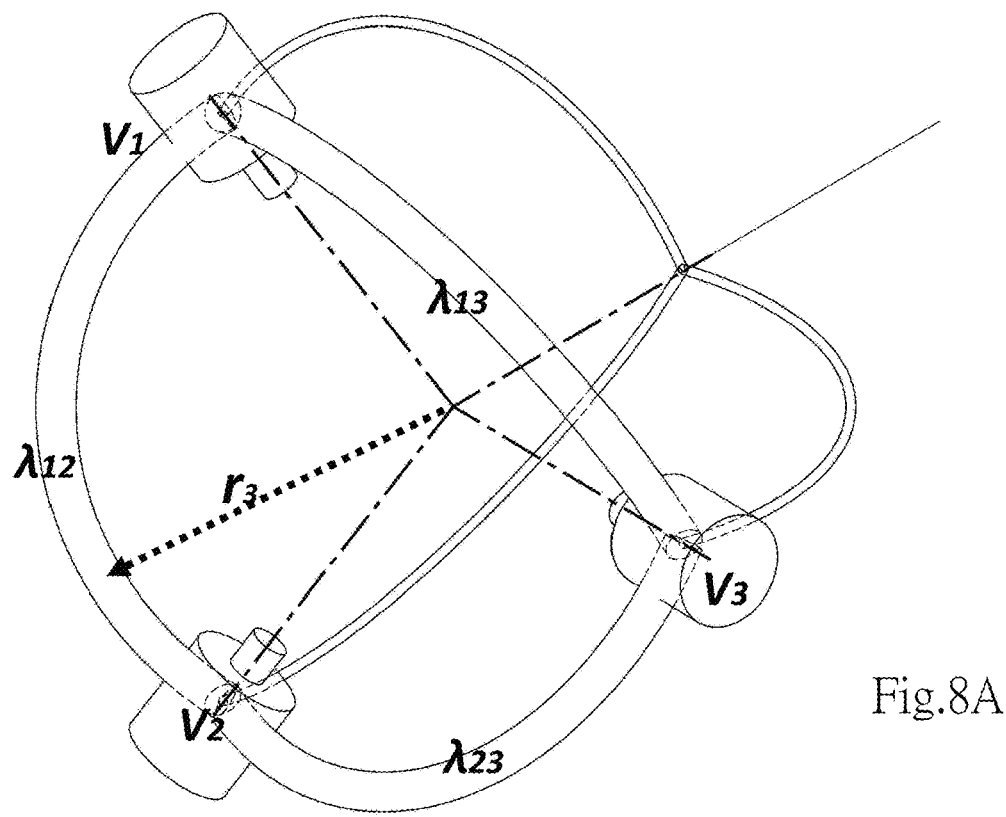
FIG. 8A shows a geometry and 3-view drawing of terminal frame for orbit sequence II.

The mechanism is inherited the similar spherical concentric geometry from our certified patents. An important issue is how to make a concentric mechanism operate smoothly without mutual interference and/or singularity while contemplating practical design and regulating geometric limitation. Therefore, two orbit sequences are classified for the mechanism. Orbit sequence I: The radius of the base frame's geometric orbit is "greater than" the radius of the terminal frame's geometric orbit, and the radius of each base arc-link's geometric orbit is "greater than" the radius of each terminal arc-link's geometric orbit, i.e.: $r_0 > r_1 > r_2 > r_3$, shown as FIG. 1A, FIG. 3A, FIG. 5A and FIG. 7A. Orbit sequence II: The radius of the base frame's geometric orbit is "less than" the radius of the terminal frame's geometric orbit, and the radius of each base arc-link's geometric orbit is "less than" the radius of each terminal arc-link's geometric orbit, i.e.: $r_0 < r_1 < r_2 < r_3$, shown as FIG. 2A, FIG. 4A, FIG. 6A and FIG. 8A.

The mechanism is constituted by concentric geometric axes for spherical coordinate kinematics. The mechanism comprises a base frame set, a terminal frame set, three arc-link sets, three base driver sets and three terminal driver sets.

Figure 1B:
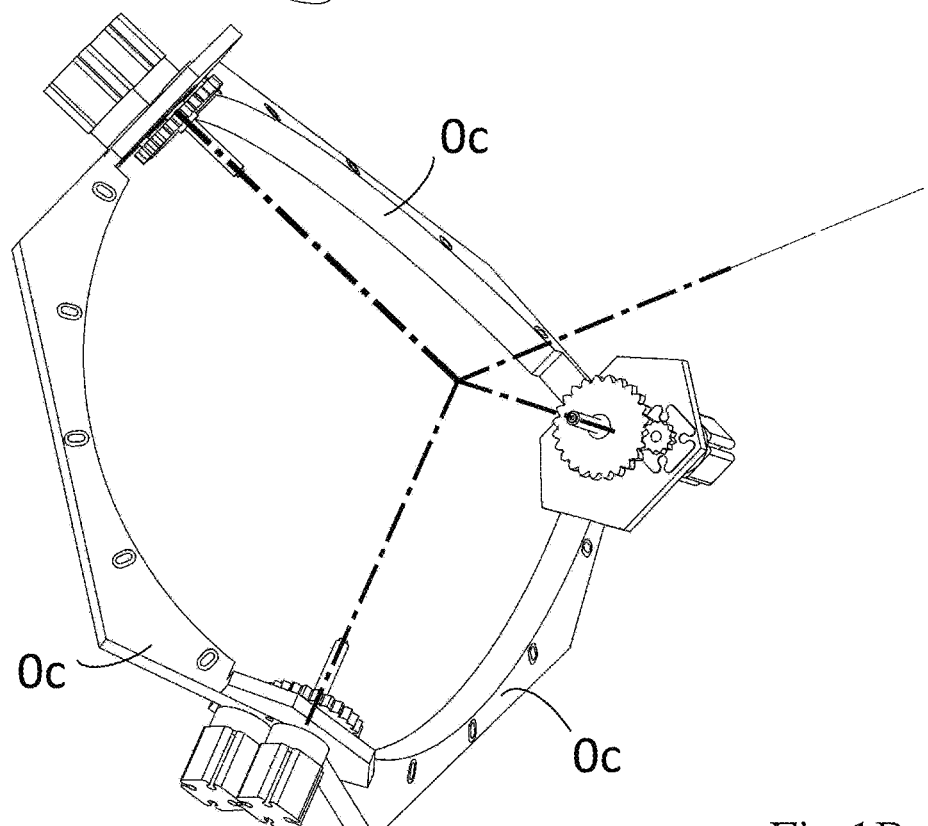
FIG. 1B shows a geometry and 3-view drawing of base frame for orbit sequence I.
Figure 2B:
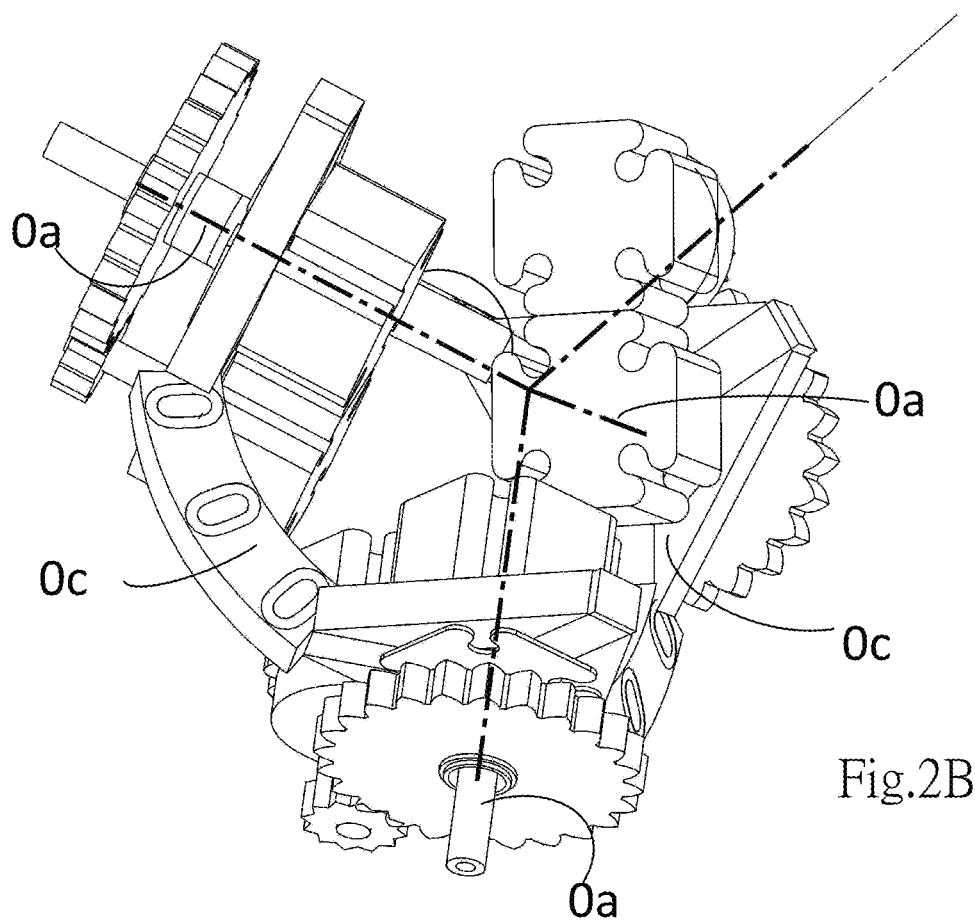
FIG. 2B shows a geometry and 3-view drawing of base frame for orbit sequence II.

The base frame set comprises a base frame $0c$ including a plurality of brackets and three base rotating module $0a$ installed into the base frame $0c$. The base frame $0c$ is configured with three vertexes which can be used to constitute a base geometry triangle, each axis of base rotating module $0a$, denoted by unit vector $U_i$, wherein $i = 1{\sim}3$, is individually coincided with a vertex-to-centerline of the base geometry triangle, and these three vertex-to-center lines are coincided with the center of the base frame $0a$. An angle between any two vertex-to-center lines of the base geometry triangle is geometrically represented as $\Lambda_{ij}=\text{ArcCos}(U_i \cdot U_j)$, wherein i=1~3, j=1~3 but i≠j. The angle between any two vertex-to-center lines of the base geometry triangle is greater than 75° and less than 150°, i.e.: $75°<\Lambda_{ij}<150°$. The geometric definition of base frame set is shown as FIG. 1A~FIG. 1B and FIG. 2A~FIG. 2B. The radius of the base frame's geometric orbit is denoted by $r_0$, shown as FIG. 1A, and FIG. 2A.

Each base rotating module $0a$ comprises a bored shaft $0a1$ and an inner shaft $0a2$. Both ends of the bored shaft $0a1$ are indicated as active end and passive end. Both ends of the inner shaft $0a2$ are indicated as active end and passive end. The bored shaft $0a1$ being pivotally rotated with the inner shaft $0a2$.

Figure 7B:
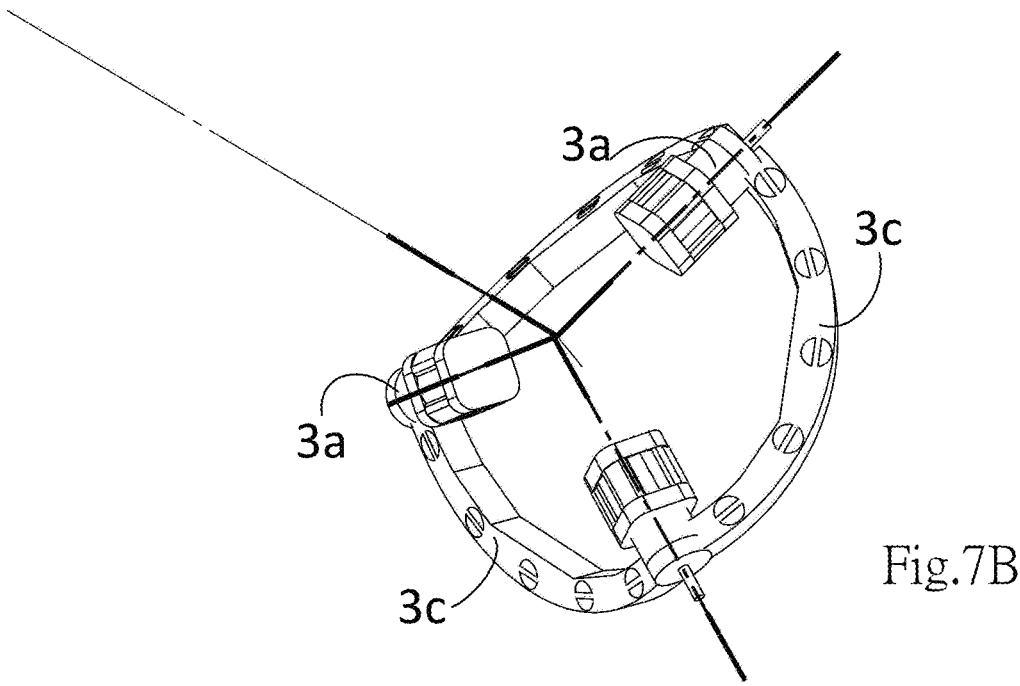
FIG. 7B shows a geometry and 3-view drawing of terminal frame for orbit sequence I.
Figure 8B:
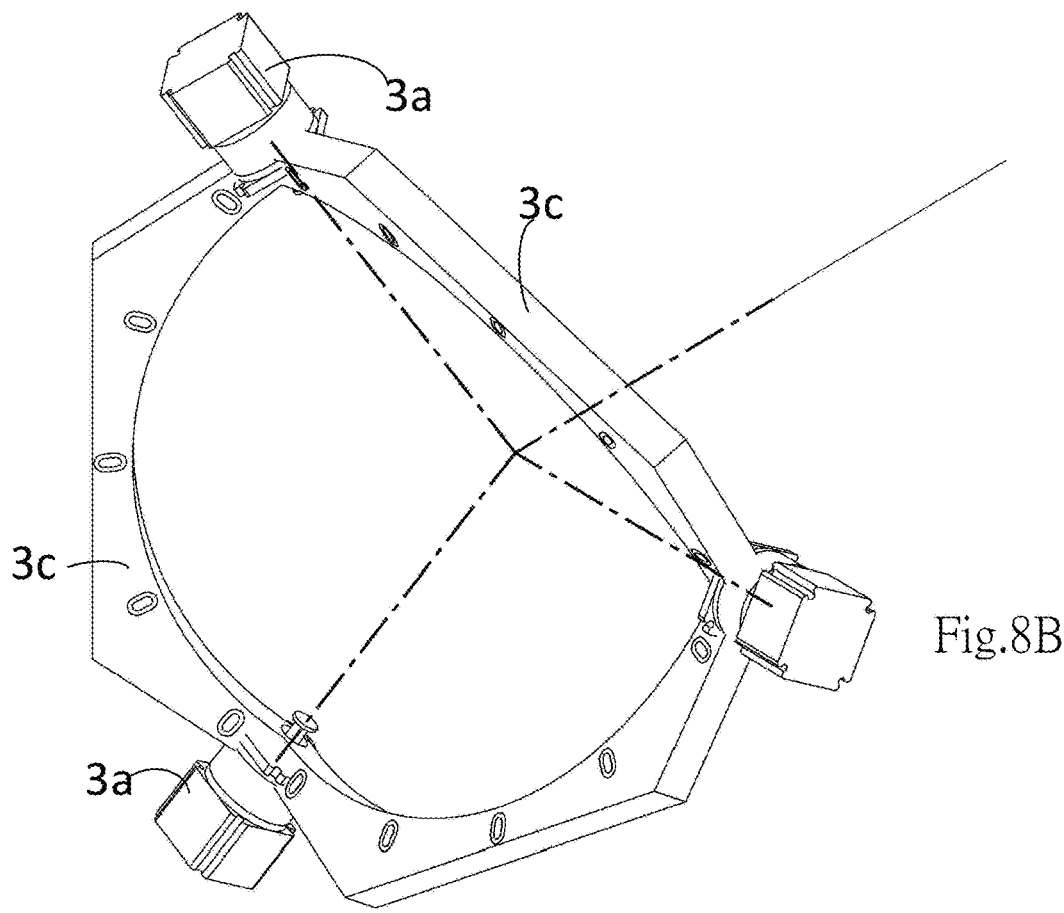
FIG. 8B shows a geometry and 3-view drawing of terminal frame for orbit sequence II.

The terminal frame set comprises a terminal frame $3c$ including a plurality of brackets and three terminal rotating module $3a$ installed into the terminal frame $3c$. The terminal frame $3c$ is configured with three vertexes which can be used to constitute a terminal geometric triangle, each axis of terminal rotating module $3a$, denoted by unit vector $V_i$, wherein i=1-3, is individually coincided with a vertex-to-center line of the terminal geometric triangle, and these three vertex-to-center lines are coincided with the center of the terminal frame $3a$. An angle between any two vertex-to-center lines of the terminal geometric triangle is geometrically represented as $\lambda_{ij}=\text{ArcCos}(V_i \cdot V_j)$, wherein i=1~3, j=1~3 but i≠j. The angle between any two vertex-to-center lines of the terminal geometric triangle is greater than 75° and less than 150°, i.e.: $75°<\lambda_{ij}<150°$. The geometric definition of terminal frame set is shown as FIG. 7A~FIG. 7B and FIG. 8A~FIG. 8B. The radius of the terminal frame's geometric orbit is denoted by $r_3$ shown as FIG. 7A, and FIG. 8A.

The three arc-link sets, each arc-link set comprises a base arc-link $1c$, a terminal arc-link $2c$, an arc-link rotating module $2a$, a base pulley $2p$, a terminal pulley $2q$, a transmission belt $2b$ and at least one pair of idler pulleys $2z$. Both ends of the base arc-link $1c$ are indicated as base end and terminal end. Both ends of the terminal arc-link $2c$ are indicated as base end and terminal end.

The base end of the base arc-link $1c$ is pivotally rotated with the base end of the terminal arc-link $2c$ via the arc-link rotating module $2a$. The base end of the base arc-link $1c$ is pivotally fastened onto the passive end of the inner shaft $0a2$ of the base rotating module $0a$. The terminal end of the terminal arc-link $2c$ is pivotally rotated with an axis of the terminal rotating module $3a$, each axis of arc-link rotating modules $2a$, denoted by unit vector $W_i$, wherein i=1~3, is normally directed into the center of the base frame $0c$ for concentrically rotating each arc-link set along specified geometric orbit between the base frame $0c$ and two terminal frames $3c$. The radius of each base arc-link's geometric orbit is denoted by $r_1$. The radius of each terminal arc-link's geometric orbit is denoted by $r_2$.

Figure 3B:
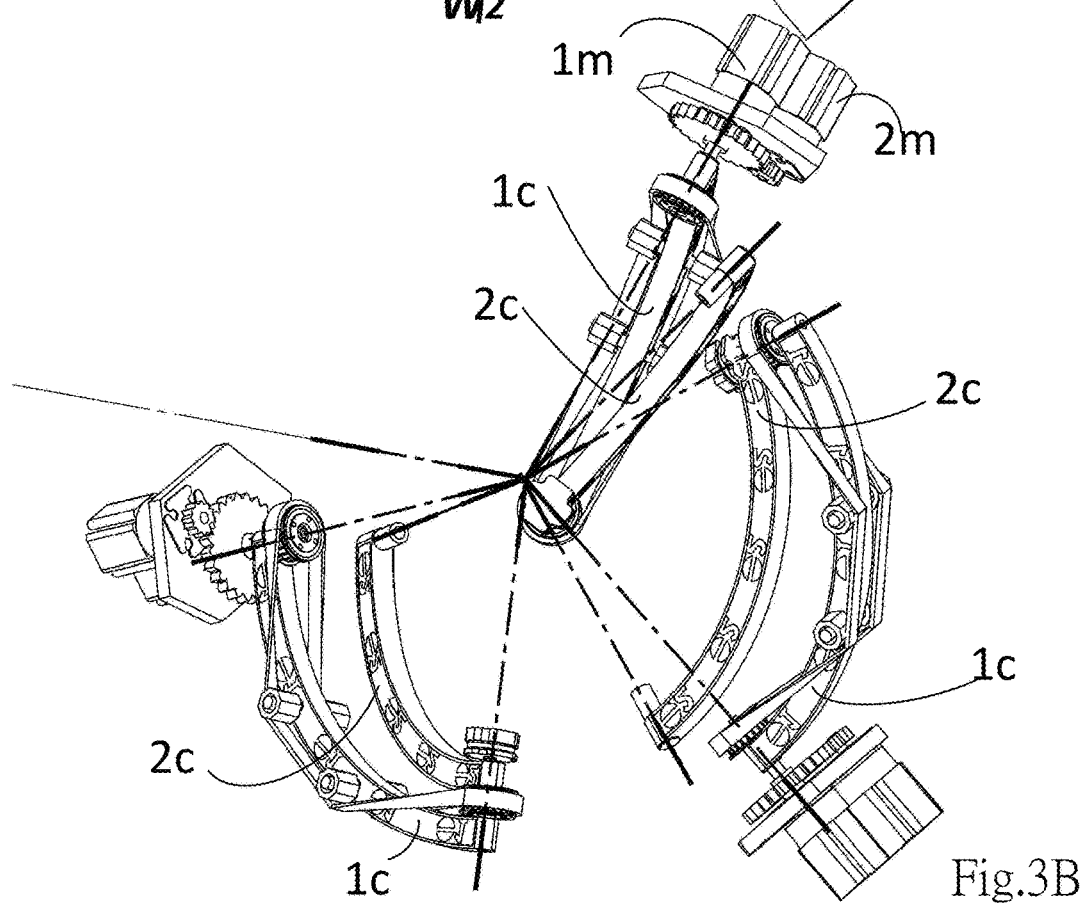
FIG. 3B shows a geometry and 3-view drawing of three arc-link sets for orbit sequence I.
Figure 4B:
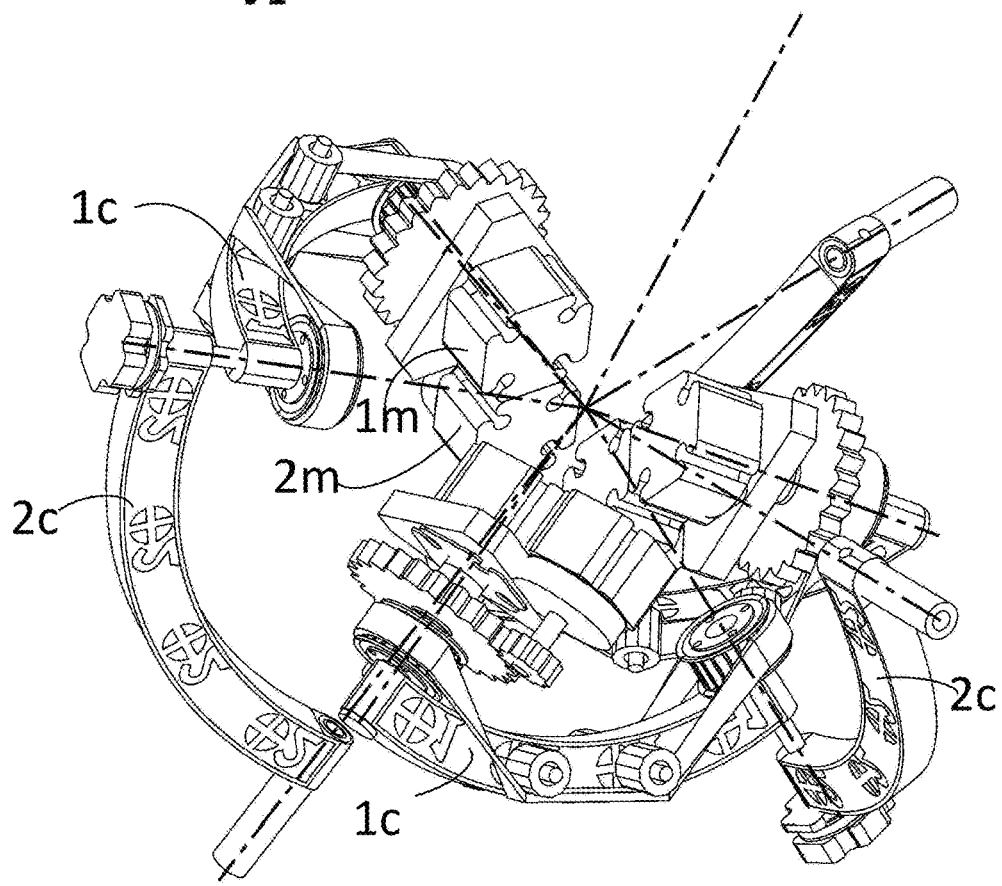
FIG. 4B shows a geometry and 3-view drawing of three arc-link sets for orbit sequence II.
Figure 5B:
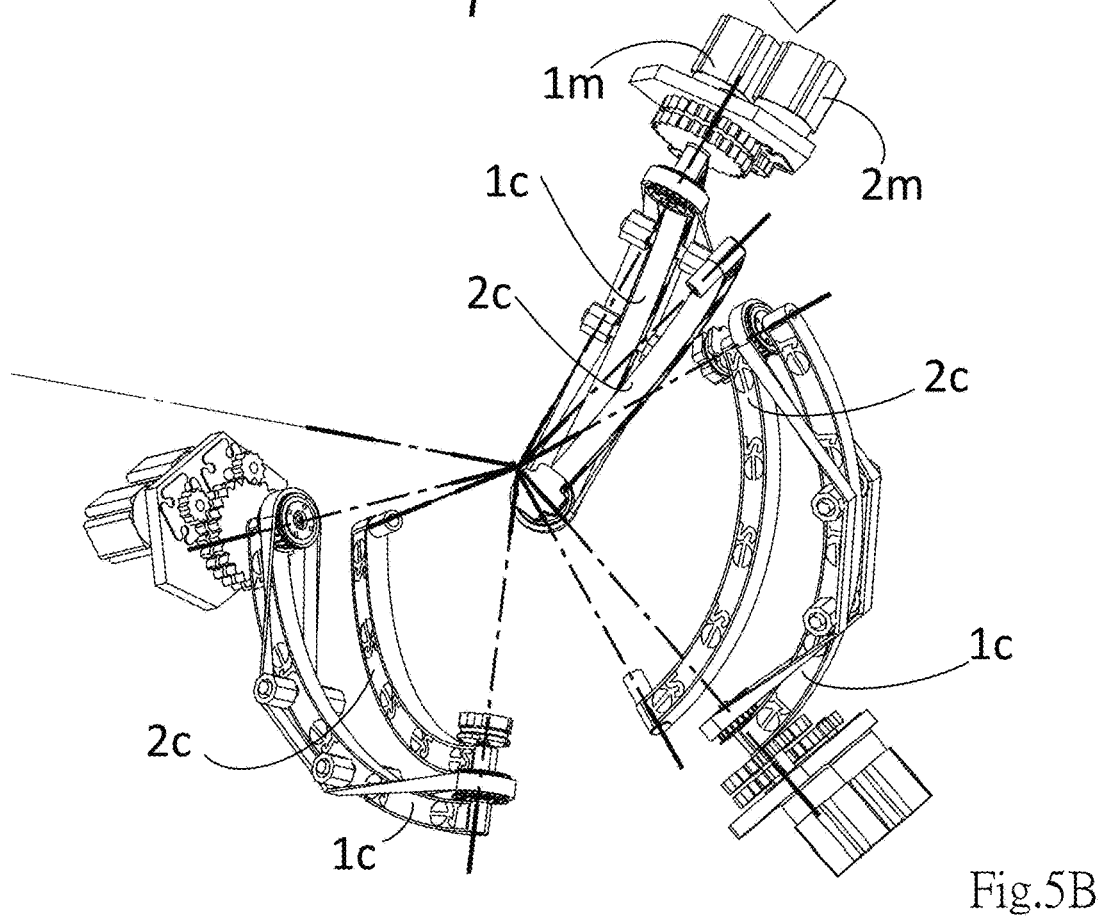
FIG. 5B shows a geometry and 3-view drawing of three arc-link sets for orbit sequence I.
Figure 6B:
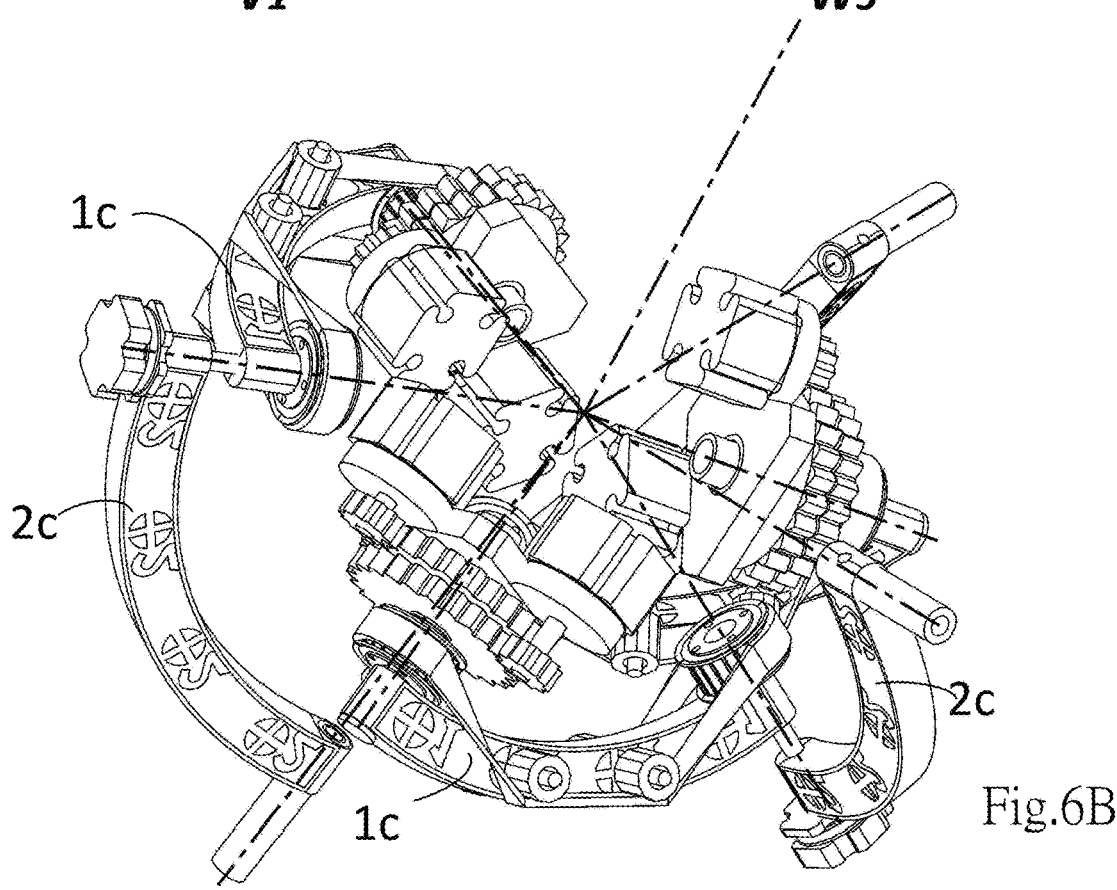
FIG. 6B shows a geometry and 3-view drawing of three arc-link sets for orbit sequence II.

Arc-length of a base arc-link $1c$, geometrically represented by $\alpha_i=\text{ArcCos}(U_i \cdot W_i)$, wherein i=1~3, is defined as an angle between two geometric axes of the base rotating module $0a$ and the arc-link rotating module $2a$ which are individually connected with the same base arc-link $1c$. Arc-length of a terminal arc-link $2c$, geometrically represented by $\beta_i=\text{ArcCos}(V_i \cdot W_i)$, wherein i=1~3, is defined as an angle between two geometric axes of terminal rotating module $3a$ and the arc-link rotating module $2a$ which are individually connected with the same terminal arc-link $2c$. Shown as FIG. 3B, FIG. 4B, FIG. 5B and FIG. 6B.

Referring to our first certified patent, singularities avoidance and geometric limitation were clearly introduced and specifically analyzed. The sum of arc-lengths of any two of the base arc-links is greater than or equal to an angle between their corresponding vertex-to-center lines of the base geometric triangle, i.e.: $\Lambda_{ij} \leq \alpha_i + \alpha_j$, wherein i=1~3, j=1~3 but i≠j. The sum of arc-lengths of any two of the terminal arc-links is greater than or equal to an angle between their corresponding vertex-to-center lines of the same terminal geometric arc, i.e.: $\lambda_{ij} \leq \beta_i + \beta_j$, wherein i=1~3, j=1~3 but i≠j. There are total nine geometric axes in these three arc-link sets for pivoting with three base rotating modules $0a$, three arc-link rotating modules $2a$ and three terminal rotating modules $3a$ individually.

The base pulley $2p$ is pivotally fastened onto the active end of bored shaft $0a1$ of the base rotating module $0a$. The terminal pulley $2q$ is pivotally fastened onto the base end of the terminal arc-link $2c$. At least one pair of idler pulleys $2z$ are installed within the outer flange of the base arc-link $1c$. The at least one pair of idler pulleys $2z$ are installed onto both sides of the base arc-link $1c$ individually.

Figure 3C:
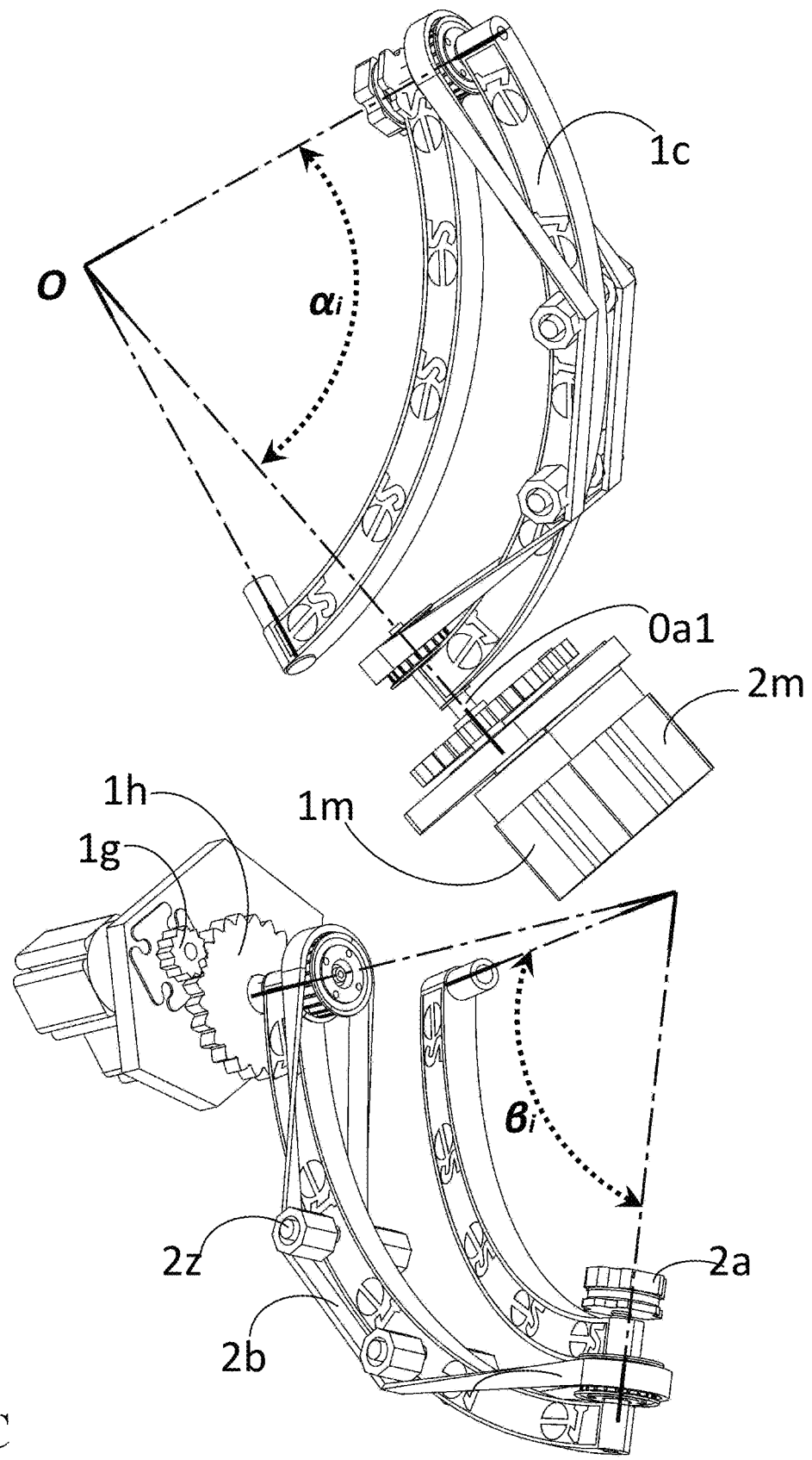
FIG. 3C shows a geometry and 3-view drawing of three arc-link sets for orbit sequence I.
Figure 4C:
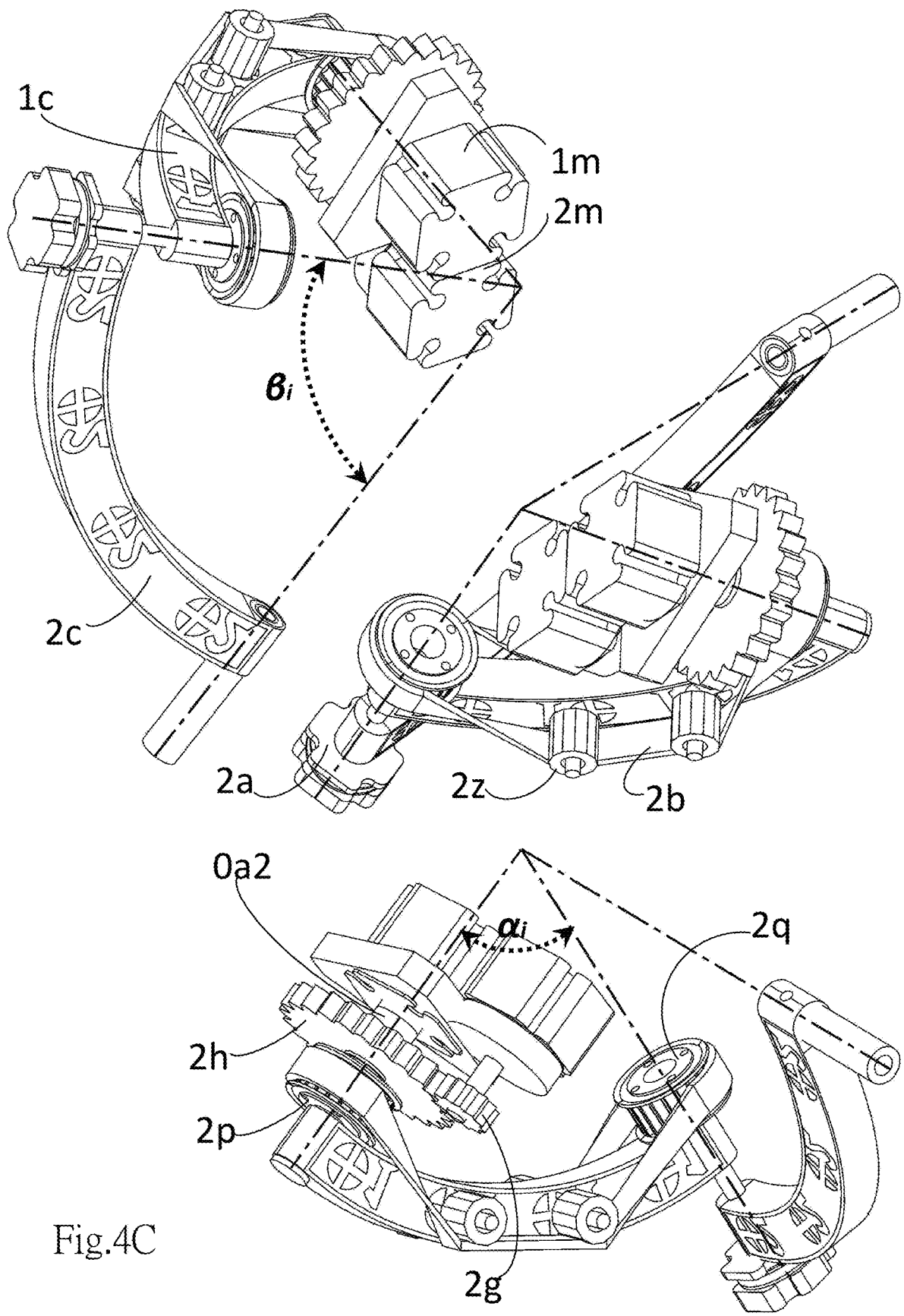
FIG. 4C shows a geometry and 3-view drawing of three arc-link sets for orbit sequence II.
Figure 5C:
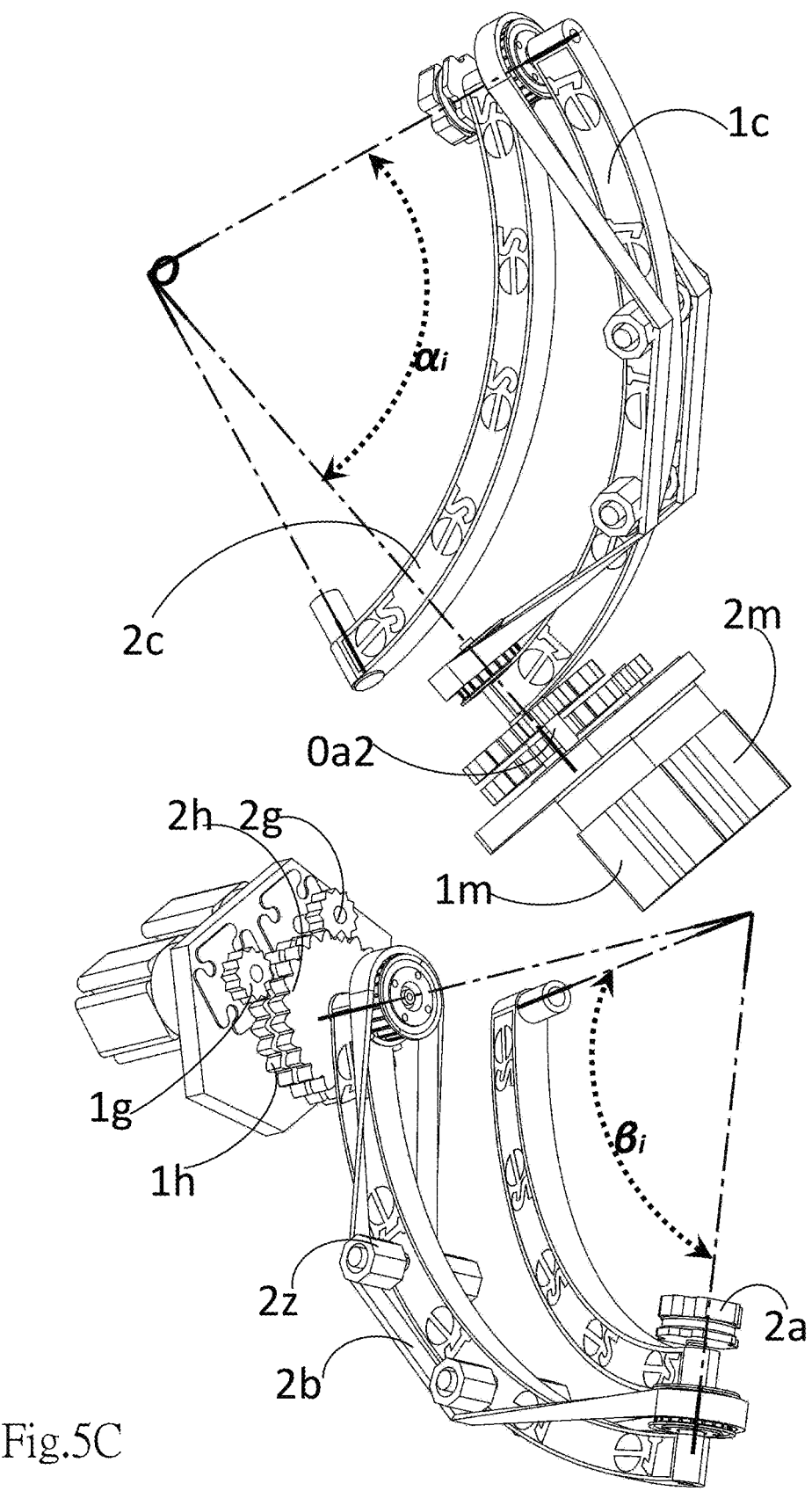
FIG. 5C shows a geometry and 3-view drawing of three arc-link sets for orbit sequence I.
Figure 6C:
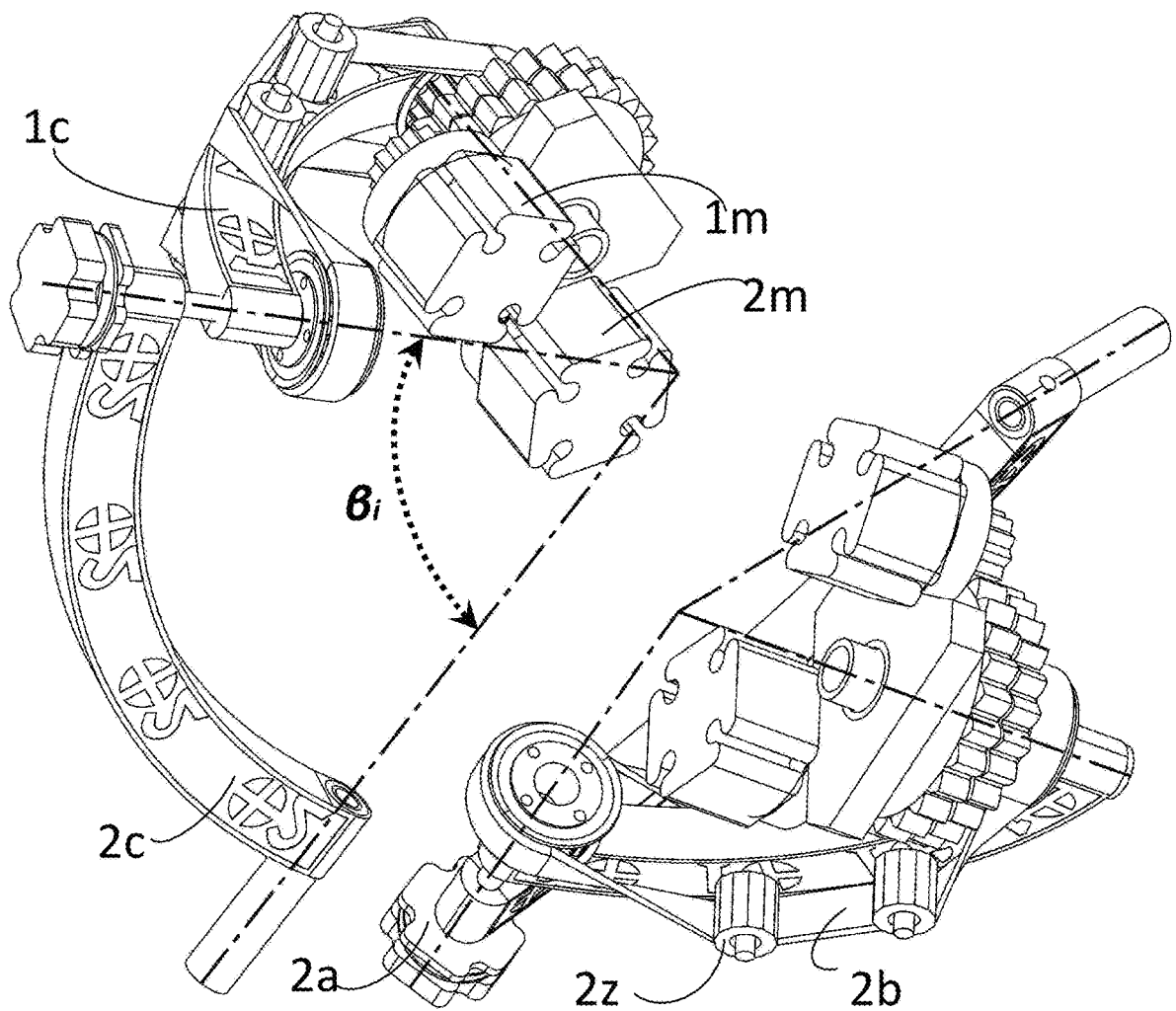
FIG. 6C shows a geometry and 3-view drawing of three arc-link sets for orbit sequence II.
Figure 6C:
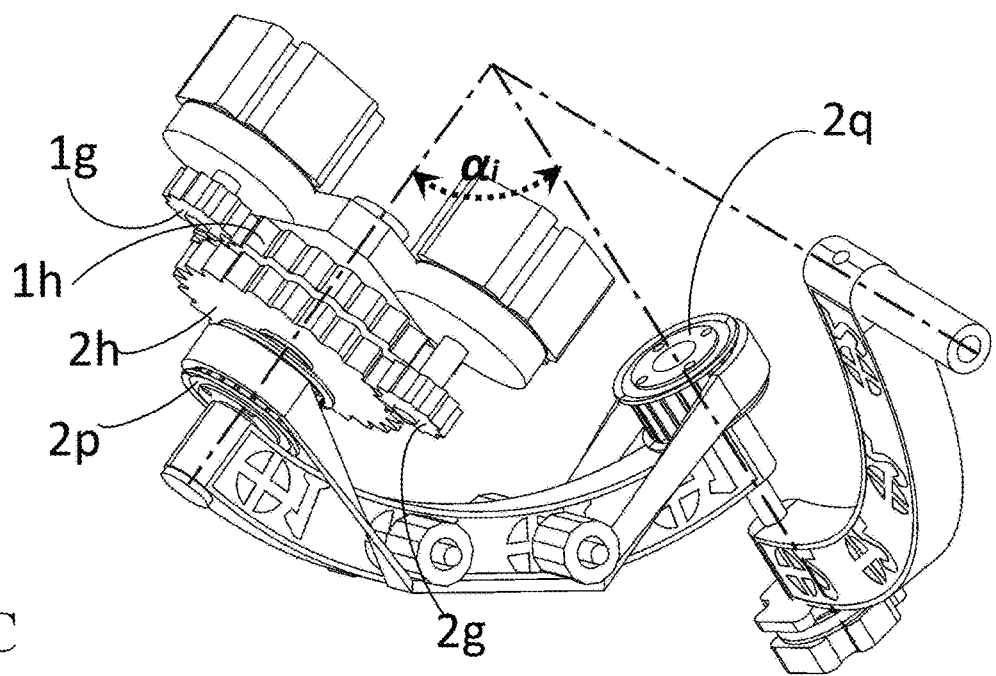

Both ends of the transmission belt $2b$ are separately meshed and rotated with the base pulley $2p$ and the terminal pulley $2q$. Direction and tension of the transmission belt $2b$ are functionally adjusted by the at least one pair of idler pulleys $2z$. The terminal pulley $2q$ is synchronously rotated via the transmission belt $2b$ by the base pulley $2p$. Shown as FIG. 3C, FIG. 4C, FIG. 5C and FIG. 6C.

Three base driver sets, each base driver set comprises a base driving module $1m$, a base active gear $1g$ and a base passive gear $1h$. The base active gear $1g$ is fastened onto the driving shaft of the base driving module $1m$. The base passive gear $1h$ is pivotally fastened onto the passive end of the bored shaft $0a1$ of the base rotating module $0a$.

Figure 9A:
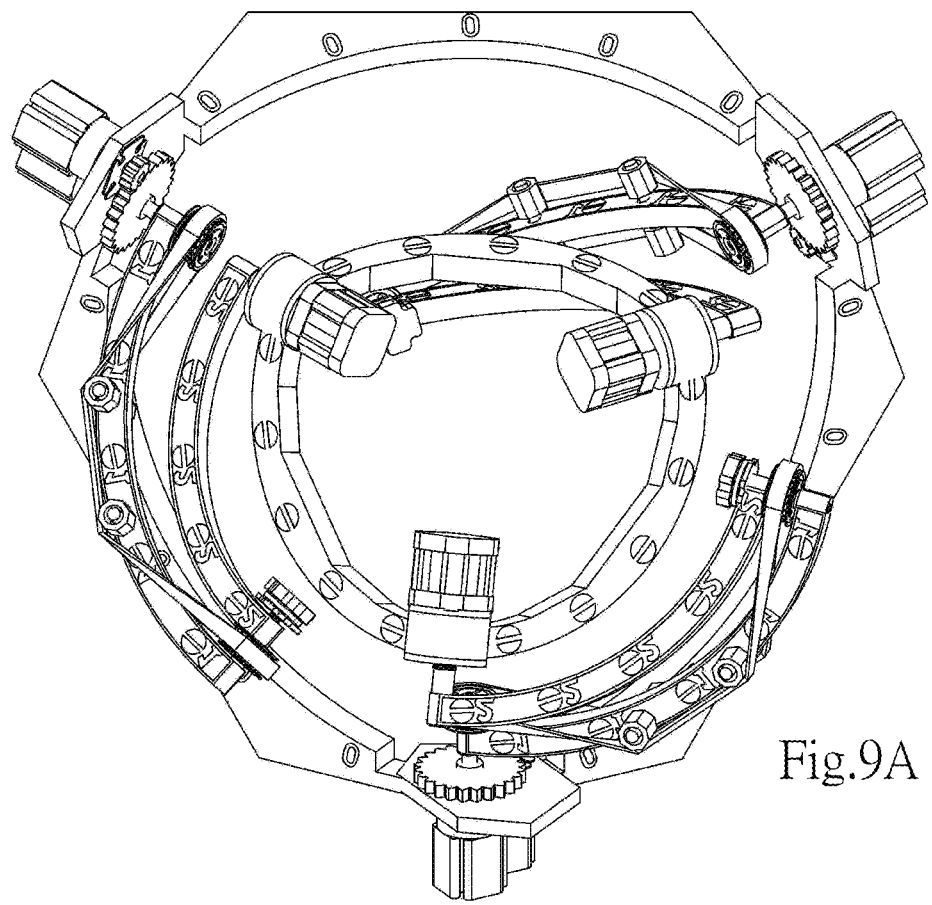
FIG. 9A shows the first embodiment's 3-view drawing for orbit sequence I.
Figure 9B:
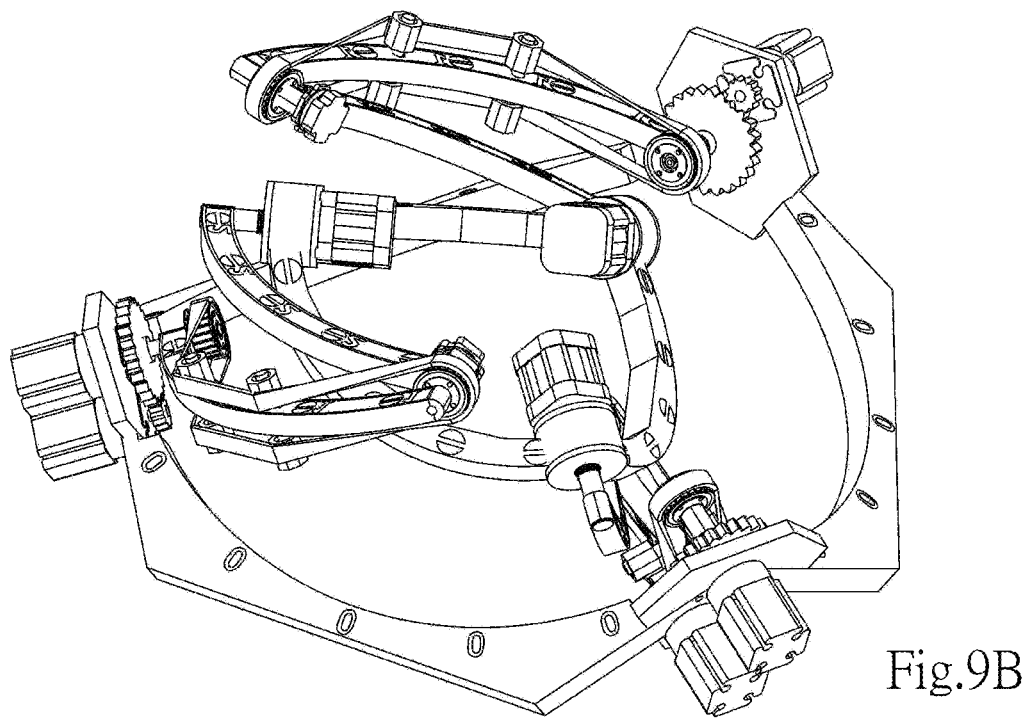
FIG. 9B shows the first embodiment's 3-view drawing for orbit sequence I.
Figure 9C:
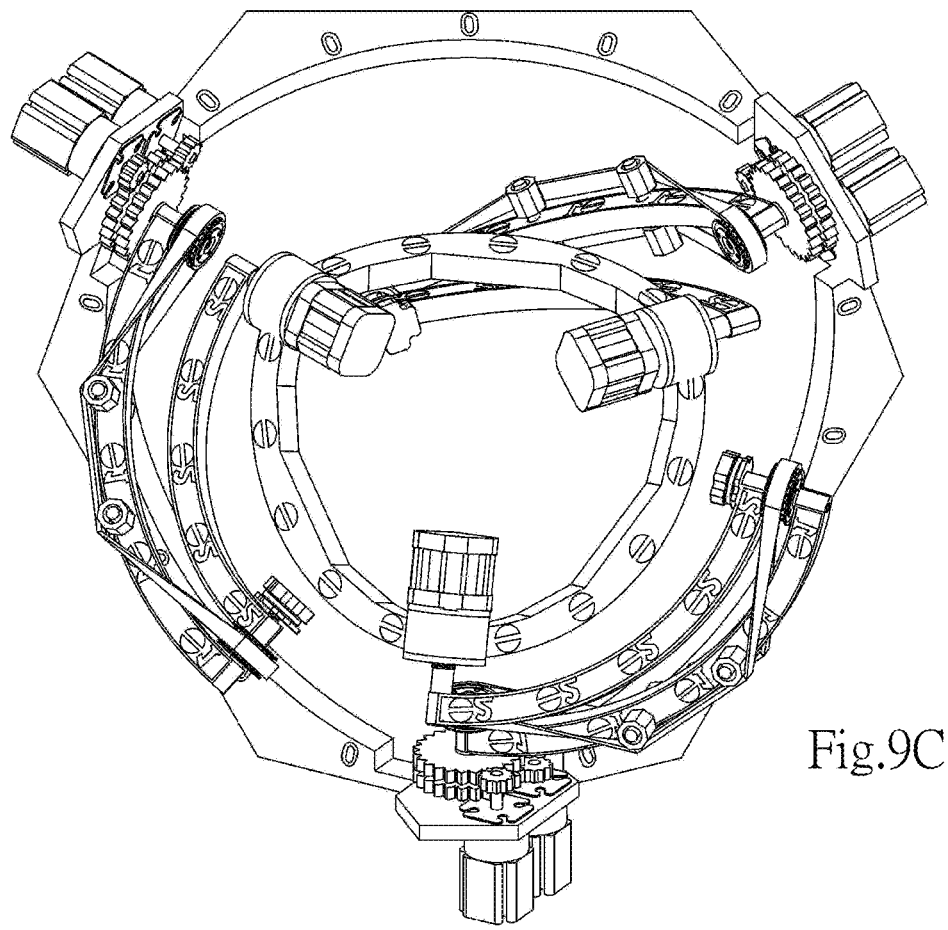
FIG. 9C shows the first embodiment's 3-view drawing for orbit sequence I.
Figure 9D:
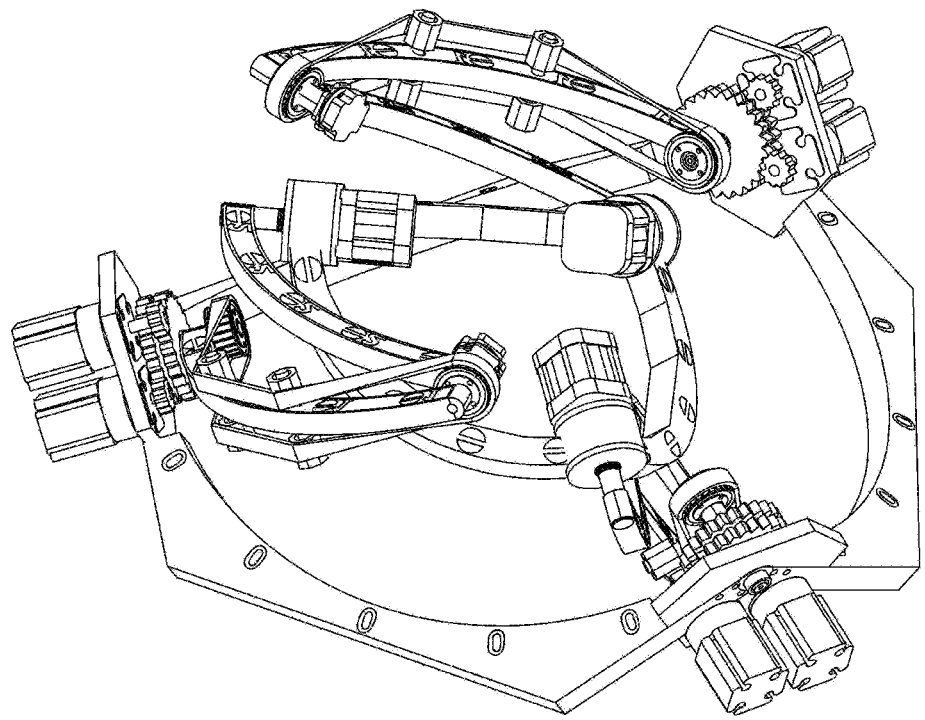
FIG. 9D shows the first embodiment's 3-view drawing for orbit sequence I.
Figure 10A:
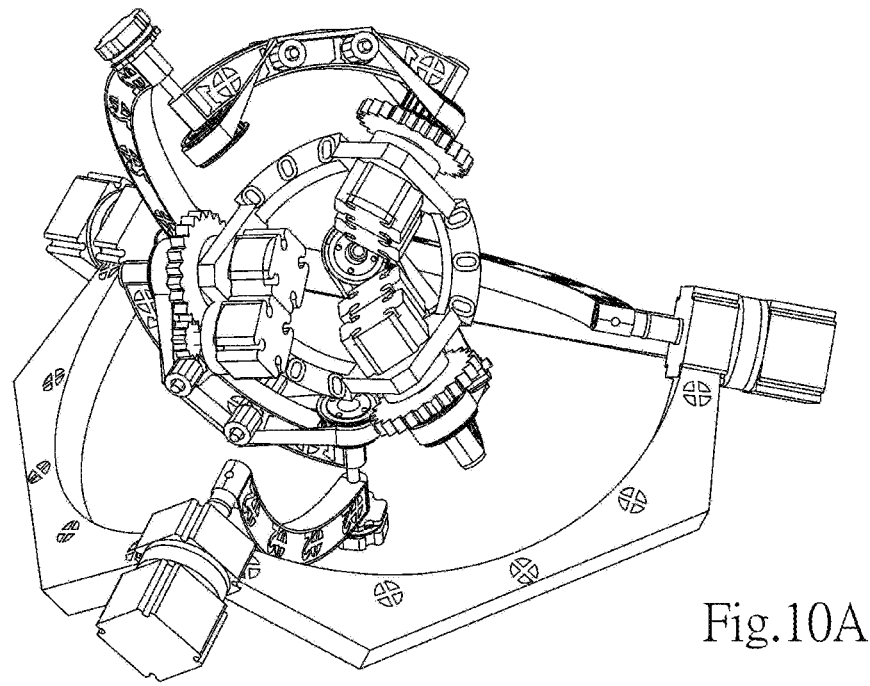
FIG. 10A shows the first embodiment's 3-view drawing for orbit sequence II.
Figure 10B:
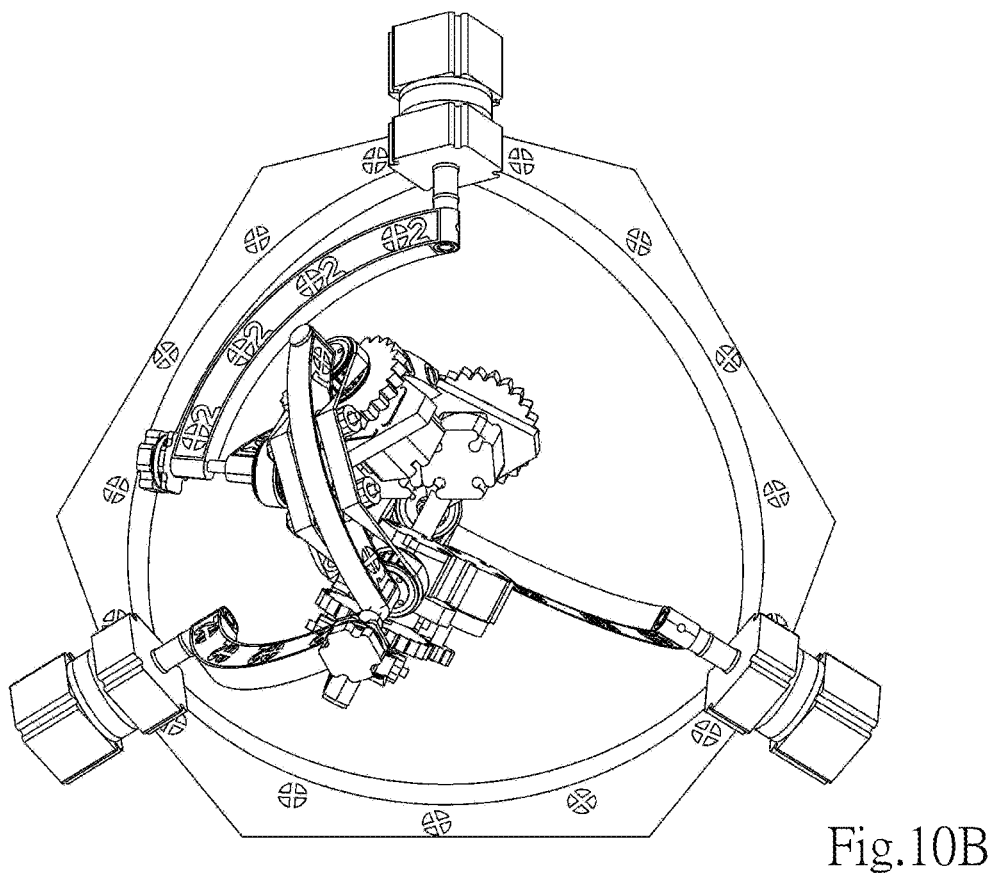
FIG. 10B shows the first embodiment's 3-view drawing for orbit sequence II.
Figure 10C:
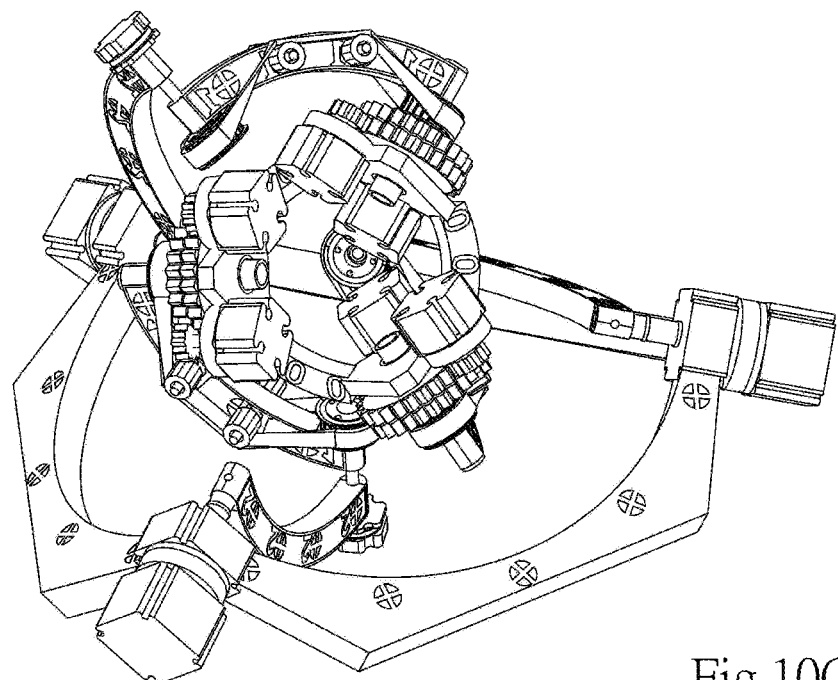
FIG. 10C shows the first embodiment's 3-view drawing for orbit sequence II.
Figure 10D:
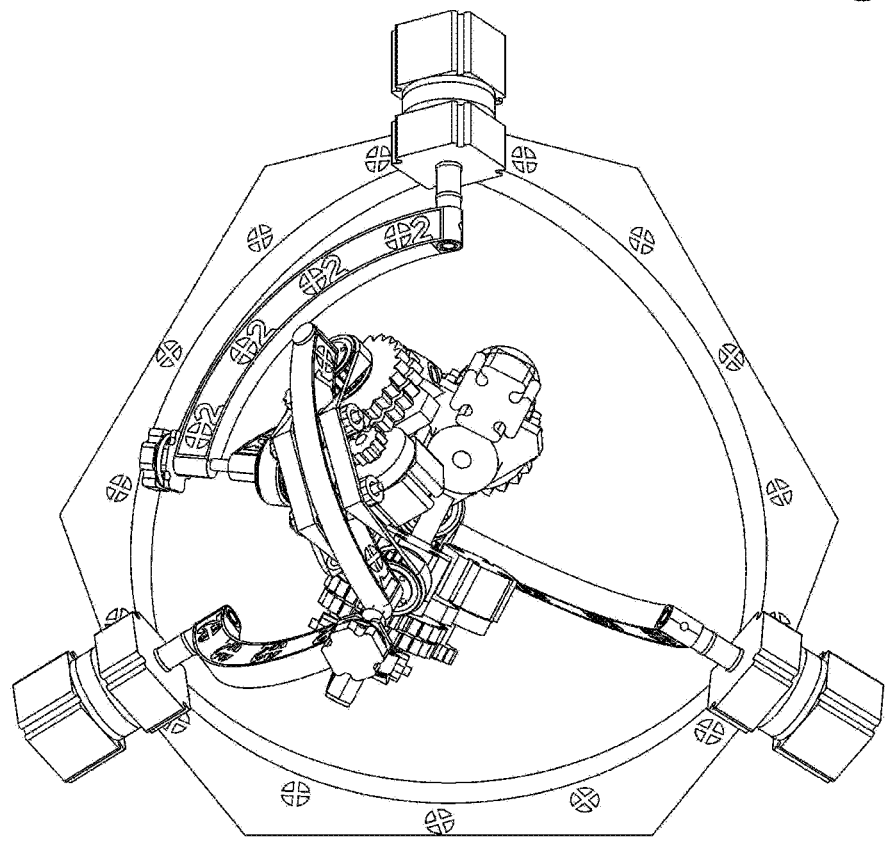
FIG. 10D shows the first embodiment's 3-view drawing for orbit sequence II.

According to pre-defined gear ratio, the base active gear $1g$ and the base passive gear $1h$ are selected to meet design requirement. Let the distance between center of the base active gear $1g$ and the base passive gear $1h$ is equal to sum of reference radii of the base active gear $1g$ and the base passive gear $1h$. The base passive gear $1h$ meshed with the base active gear $1g$ is synchronously rotated by the base driving module $1m$. Shown as FIG. 5B~5C, FIG. 6B~6C, FIG. 9C~9D and FIG. 10C~10D.

The distance between center of the base active gear $1g$ and the base passive gear $1h$ can be zero, then the base active gear $1g$ and the base passive gear $1h$ are not expected. Therefore, the base driving module $1m$ is directly fastened onto the passive end of the bored shaft $0a1$ of the base rotating module $0a$. Shown as FIG. 3B~3C, FIG. 4B~4C, FIG. 9A~9B and FIG. 10A~10B.

Three terminal driver sets, each terminal driver set comprises a terminal driving module $2m$, a terminal active gear $2g$ and a terminal passive gear $2h$. The terminal active gear $2g$ is fastened onto the driving shaft of the terminal driving module $2m$. The terminal passive gear $2h$ is pivotally fastened onto the passive end of the inner shaft $0a2$ of the base rotating module $0a$. According to pre-defined gear ratio, the terminal active gear $2g$ and center of the terminal passive gear $2h$ are selected to meet design requirement. Let the distance between center of the terminal active gear $2g$ and center of the terminal passive gear $2h$ is equal to sum of reference radii of the terminal active gear $2g$ and center of the terminal passive gear $2h$. The terminal passive gear $2h$ meshed with the terminal active gear $2g$ is synchronously rotated by the terminal driving module 2*m*. Shown as FIG. 3B~3C, FIG. 4B~4C, FIG. 5B~5C, FIG. 6B~6C, FIG. 9A~9D and FIG. 10A~10D.

There are two embodiments for realizing the two orbit sequences. The first embodiment is the orbit sequence I, shown as FIG. 9A-FIG. 9D. The second embodiment is the orbit sequence II, shown as FIG. 10A-FIG. 10D.

The base frame 0*c* can be either close-chain structure or open-chain structure. The terminal frame 3*c* can be either close-chain structure or open-chain structure. Close-chain structure is designed to enhance rigidity to avoid vibration and deformation. Open-chain structure is designed for preventing predictable interference caused by arc-link sets.

Each transmission belt can be timing belt or round belt or cable or chain. Each terminal pulley can be timing pulley or winch pulley or V-groove pulley or sprocket.

The base rotating module 0*a* can be assembled by a torque output device and/or an angle sensor and/or a bearing with an shaft. The arc-link rotating module 2*a* can be assembled by a torque output device and/or an angle sensor and/or a bearing with an shaft. The terminal rotating module 3*a* can be assembled by a torque output device and/or an angle sensor and/or a bearing.

Those skilled in the art will readily observe that numerous modifications and alterations of the device and method may be made while retaining the teachings of The mechanism. Accordingly, the above disclosure should be construed as limited only by the metes and bounds of the appended claims.

What is claimed is:

1. A mechanism constituted with spherical concentric geometry to be manipulated for spherical coordinate kinematics, comprising:
    a base frame set comprising a base frame including a plurality of brackets and three base rotating modules installed into the base frame, the base frame being configured with three vertexes which can be used to constitute a base geometry triangle, each axis of the base rotating module being individually coincided with a vertex-to-center line of the base geometry triangle, and these three vertex-to-center lines being coincided with the center of the base frame, wherein an angle between any two vertex-to-center lines of the base geometry triangle is greater than 75° and less than 150°, each base rotating module comprising a bored shaft and an inner shaft, the bored shaft comprising an active end and a passive end, the inner shaft comprising an active end and a passive end, wherein the bored shaft is pivotally rotated with the inner shaft;
    a terminal frame set comprising a terminal frame including a plurality of brackets and three terminal rotating modules installed into the terminal frame, the terminal frame being configured with three vertexes which can be used to constitute a terminal geometric triangle, each axis of the terminal rotating module being individually coincided with a vertex-to-center line of the terminal geometric triangle, and these three vertex-to-center lines being coincided with the center of the terminal frame, wherein the angle between any two vertex-to-center lines of the terminal geometric triangle is greater than 75° and less than 150°;
    three arc-link sets, each arc-link set comprising a base arc-link, a terminal arc-link, and arc-link rotating module, a base pulley, a terminal pulley, a transmission belt and at least one pair of idler pulleys, the base arc-link comprising a base end and a terminal end, the terminal arc-link comprising a base end and a terminal end, the base end of the base arc-link being pivotally rotated with the base end of the terminal arc-link via the arc-link rotating module, the base end of the base arc-link being pivotally fastened onto the passive end of the inner shaft, the terminal end of the terminal arc-link being pivotally rotated along an axis of the terminal rotating module, each axis of the arc-link rotating modules being normally directed into the center of the base frame for concentrically rotating each arc-link set along a specified geometric orbit between the base frame and the terminal frames, wherein the sum of arc-lengths of any two of the base arc-links is greater than or equal to an angle between their corresponding vertex-to-center lines of the base geometry triangle; wherein the sum of arc-lengths of any two of the terminal arc-links is greater than or equal to an angle between their corresponding vertex-to-center lines of the terminal geometric arc, the base pulley being pivotally fastened onto the active end of the bored shaft, the terminal pulley being pivotally fastened onto the base end of the terminal arc-link, the at least one pair of idler pulleys being installed onto both sides of the base arc-link individually, wherein at least one pair of idler pulleys being installed within an outer flange of the base arc-link, both ends of the transmission belt being separately meshed and rotated with the base pulley and the terminal pulley, wherein direction and tension of the transmission belt being functionally adjusted by the at least one pair of idler pulleys, wherein the terminal pulley being synchronously rotated via the transmission belt by the base pulley;
    three base driver sets, each base driver set comprising a base driving module, a base active gear and a base passive gear, the base active gear being fastened onto a driving shaft of the base driving module, the base passive gear being pivotally fastened onto the passive end of the bored shaft, a distance between a center of the base active gear and a center of the base passive gear being equal to a sum of reference radii of the base active gear and the base passive gear, wherein the base passive gear meshed with the base active gear being synchronously rotated by the base driving module;
    three terminal driver sets, each terminal driver set comprising a terminal driving module, a terminal active gear and a terminal passive gear, the terminal active gear being fastened onto a driving shaft of the terminal driving module, the terminal passive gear being pivotally fastened onto the passive end of the inner shaft, distance between center of the terminal active gear and center of the terminal passive gear is equal to a sum of reference radii of the terminal active gear and the terminal passive gear, wherein the terminal passive gear meshed with the terminal active gear being synchronously rotated by the terminal driving module.

2. The mechanism according to claim 1, the distance between center of the base active gear and the base passive gear being zero, the base driving module being directly fastened onto the passive end of the bored shaft.

3. The mechanism according to claim 1, wherein each transmission belt comprises a timing belt or a round belt or cable or chain; each terminal pulley comprises a timing pulley or a winch pulley or a V-groove pulley or sprocket.

4. The mechanism according to claim 1, wherein each base rotating module comprises at least one of a torque output device, an angle sensor, and a bearing with a shaft; and each arc-link rotating module comprises at least one of a torque output device, an angle sensor, and a bearing with a shaft; and each terminal rotating module comprises at least one of a torque output device, an angle sensor and a bearing.

5. The mechanism according to claim 1, wherein the base frame is either a close-chain structure designed to enhance rigidity for preventing vibration and deformation; or an open-chain structure designed for preventing predictable interference caused by arc-link sets.

6. The mechanism according to claim 1, wherein the terminal frame is either a close-chain structure designed to enhance rigidity for preventing vibration and deformation; or an open-chain structure designed for preventing predictable interference caused by arc-link sets.

* * * * *